United States Patent
Espeseth et al.

(10) Patent No.: US 6,804,751 B2
(45) Date of Patent: Oct. 12, 2004

(54) METHOD AND APPARATUS FOR IMPROVING EFFICIENCY OF OPERATION OF A HARD DISK DRIVE BY DEFERRING COMMAND EXECUTION

(75) Inventors: Adam Michael Espeseth, Rochester, MN (US); David Robison Hall, Rochester, MN (US); James R. Shipman, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 216 days.

(21) Appl. No.: 10/102,151

(22) Filed: Mar. 20, 2002

(65) Prior Publication Data

US 2003/0182499 A1 Sep. 25, 2003

(51) Int. Cl.[7] .............................................. G06F 13/30
(52) U.S. Cl. ...................................... 711/158; 711/112
(58) Field of Search ................................ 711/112, 154, 711/158; 369/47, 52, 53

(56) References Cited

U.S. PATENT DOCUMENTS 5,570,332 A * 10/1996 Heath et al. ................ 369/30.1

* cited by examiner

*Primary Examiner*—Matthew Kim
*Assistant Examiner*—H. B. Patel
(74) *Attorney, Agent, or Firm*—Patrick Duncan; Dugan & Dugan, PC

(57) ABSTRACT

A command queue is maintained in a disk drive. The command queue includes a plurality of access commands that are awaiting execution. The command queue is sorted to provisionally select one of the plurality of access commands as the next command to be executed. A seek start deadline is calculated for the provisionally selected access command based on an estimated extra latency of the provisionally selected access command. A seek operation with respect to the provisionally selected access command is deferred based on the calculated seek start deadline, to await arrival at the disk drive of a new access command. If the new access command arrives at the disk drive prior to the seek start deadline, the respective estimated access times for the provisionally selected access command and the newly arrived access command are compared to select one of the two access commands for execution.

18 Claims, 6 Drawing Sheets

| SEEK DISTANCE (CYLINDER GROUPS) | ESTIMATED EXTRA LATENCY (SERVO ID'S) | | | | | | |
|---|---|---|---|---|---|---|---|
| | 0-2 | 3-5 | 6-8 | 9-11 | 12-14 | 15-17 | 18-20 | 21+ |
| 0 - 9 | 52 | 19 | 10 | 5 | 0 | 0 | 0 | 0 |
| 10 - 39 | 28 | 11 | 6 | 4 | 0 | 0 | 0 | 0 |
| 40 - 89 | 67 | 8 | 5 | 2 | 1 | 1 | 0 | 0 |
| 90 - 159 | 62 | 5 | 1 | 2 | 1 | 1 | 0 | 0 |
| 160 - 249 | 39 | 0 | 1 | 0 | 0 | 0 | 0 | 0 |
| 250 - 359 | 89 | 12 | 0 | 0 | 0 | 0 | 0 | 0 |
| 360 - 489 | 94 | 50 | 3 | 0 | 0 | 0 | 0 | 0 |
| 490 - 639 | 94 | 69 | 8 | 1 | 0 | 2 | 0 | 0 |
| 640 - 809 | 55 | 11 | 1 | 0 | 1 | 0 | 0 | 1 |
| 810 - 999 | 67 | 18 | 0 | 0 | 0 | 0 | 0 | 1 |
| 1000 - 1209 | 90 | 44 | 9 | 0 | 0 | 0 | 0 | 0 |
| 1210 - 1439 | 100 | 53 | 9 | 0 | 0 | 0 | 0 | 0 |
| 1440 - 1689 | 100 | 94 | 61 | 11 | 2 | 0 | 0 | 0 |
| 1690 - 1959 | 94 | 87 | 48 | 9 | 0 | 0 | 0 | 0 |
| 1960 - 2249 | 100 | 94 | 44 | 6 | 0 | 0 | 0 | 0 |
| 2250 - 2559 | 94 | 86 | 42 | 2 | 1 | 0 | 0 | 0 |
| 2560 - 2889 | 100 | 90 | 44 | 6 | 0 | 0 | 0 | 0 |
| 2890 - 3239 | 92 | 88 | 40 | 20 | 0 | 0 | 0 | 0 |
| 3240 - 3609 | 100 | 84 | 42 | 6 | 1 | 0 | 0 | 1 |
| 3610 - 3999 | 93 | 73 | 33 | 2 | 1 | 0 | 0 | 0 |
| 4000 - 4409 | 100 | 91 | 41 | 5 | 0 | 0 | 0 | 0 |
| 4410 - 4839 | 100 | 66 | 29 | 6 | 0 | 0 | 0 | 5 |
| 4840 - 5289 | 85 | 57 | 15 | 0 | 0 | 0 | 0 | 0 |
| 5290 - 5759 | 92 | 55 | 2 | 0 | 0 | 0 | 0 | 0 |
| 5760 - 6249 | 90 | 52 | 7 | 1 | 0 | 0 | 0 | 0 |
| 6250 - 6759 | 85 | 29 | 1 | 0 | 0 | 0 | 0 | 0 |
| 6760 - 7289 | 62 | 5 | 0 | 0 | 0 | 0 | 0 | 7 |
| 7290 - 7839 | 52 | 21 | 3 | 0 | 0 | 0 | 0 | 0 |
| 7840 - 8409 | 20 | 5 | 0 | 1 | 0 | 0 | 0 | 2 |
| 8410 - 8999 | 4 | 9 | 4 | 3 | 0 | 5 | 4 | 4 |

FIG. 3

| Cyl Group X | 0-2 | 3-5 | 6-8 | 9-11 | 12-14 | 15-17 | 18-20 | 20+ |
|---|---|---|---|---|---|---|---|---|
| | 63 | 51 | 32 | 24 | 10 | 3 | 3 | 3 |

START (25)

*FIG. 6*

METHOD AND APPARATUS FOR IMPROVING EFFICIENCY OF OPERATION OF A HARD DISK DRIVE BY DEFERRING COMMAND EXECUTION

FIELD OF THE INVENTION

The present invention relates generally to the data processing field, and, more particularly, relates to promoting efficient operation of a hard disk drive.

BACKGROUND OF THE INVENTION

In a hard disk drive, data signals are read from and written to a rotating disk by a head which is moved substantially radially with respect to the disk. FIG. 1 is a simplified block diagram that illustrates conventional circuitry which controls the positioning of a head in a disk drive. Signal conditioning and reading circuitry 10 receives an input signal from arm electronics, which are not shown. A signal output from the signal conditioning and reading circuitry 10 is provided to a head control circuit 12. The head control circuit 12 processes the signal received from the signal conditioning and reading circuitry 10 and outputs a control signal to an actuator drive circuit 14. The actuator drive circuit 14 provides a driving signal to a head actuator motor (not shown) which typically is a voice coil motor.

The head control circuit 12 also receives commands from a host system, which is not shown. The head control circuit 12 includes a processing capability 16, which may include one or more processors. Also included in the head control circuit 12 are one or more memory units, represented by memory block 18 in FIG. 1.

The head control circuit 12 responds to commands from the host by moving the head from a current position to a target position. Such operations are referred to as "seeks", and are intended to bring the head into a stable position at a target track or cylinder.

According to conventional practices, commands from the host may be queued in the head control circuit 12, and may be selected from the queue for execution in accordance with a process intended to minimize the average access time for execution of commands. According to a known command queue ordering technique, a Shortest Access Time First (SATF) algorithm is employed. According to this algorithm, the command selected for execution from the command queue is that which can be started first. Estimated access times for commands are contained in a seek profile table stored in the memory 18. The estimated access times indicated by the seek profile table take two factors into account: (a) the time required to seek to and settle at the target track, and (b) the additional time required for the disk to rotate so that the target sector reaches the locus of the head. This additional rotational time is sometimes referred to as "extra latency".

When a command fails to be executed within the estimated access time indicated by the seek profile table, execution of the command must await an additional rotation of the disk. This phenomenon can degrade the performance of the disk drive, and is referred to as a "miss".

FIG. 2 is a time line that illustrates a sequence of events which may occur in connection with a conventional manner of operating a hard disk drive. It should be noted that the time line of FIG. 2 indicates event sequence only, and is not drawn to scale. As indicated at 20 in FIG. 2, the disk drive sends a status message to the host system to indicate completion of execution of an access command (i.e., a read or a write). Then the disk drive begins execution of the next access command, by starting a seek operation, as indicated at 22. During the seek operation a new command is received at the disk drive from the host system, as indicated at 24. The new access command is added to the command queue, and the head control circuit 12 (FIG. 1) proceeds to sort the command queue, as indicated at 26, to determine which command in the queue will have the shortest access time upon completion of the execution of the command which is currently in progress. The command in the command queue which is determined to have the shortest access time is selected to be the next command to be executed after the currently executing command.

After the command queue sorting has occurred in background during the seek operation, the seek operation ends, as indicated at 28. That is, the read/write head has reached and settled on the target track. The head then remains positioned at the target track while waiting for the disk to rotate to bring the target sector to the locus of the head. This period of waiting may be referred to as "on-track time" and is indicated at 30. When the target sector arrives at the head, the "data phase" (indicated at 32) occurs. That is, reading of data from the disk or writing of data to the disk takes place. Upon completion of the read or write, the disk drive sends a status message (indicated at 34) to the host system. The cycle of operation is then repeated with respect to the next access command to be executed, which was selected during the command queue sorting operation indicated at 26.

There may be a number of variations in the conventional sequence of events illustrated in FIG. 2. For example, no new command may arrive prior to the command queue sort operation. Alternatively, the command queue sort operation may occur immediately after the seek start 22, then a new command may arrive, and the command queue sort operation may be performed again to determine whether the newly arrived command has a shorter access time than the command selected at the initial sort operation. Arrival of a new command and resorting of the command queue may occur at any time during the period from seek start to completion of command execution (completion of the data phase). More than one new command may be received during this period, and consequently more than one re-sort of the command queue may occur during this period.

The conventional SATF sort operation referred to in connection with FIG. 2 may be modified according to an invention that is commonly assigned herewith and referred to as DEAT (Delta Expected Access Time). The DEAT SATF algorithm is disclosed in co-pending commonly-assigned patent application Ser. No. 09/638,253, filed Aug. 14, 2000 (Attorney Docket Number ROC9-2000-0161-US1). This co-pending patent application is incorporated herein by reference.

In selecting a command for execution from the command queue, the DEAT SATF algorithm considers not only the estimated access time indicated by the seek profile table, but also the probability that the command will be executed within the estimated time. The probability information may be based on actual experience in executing commands, as indicated by a probability table. An example of a probability table provided according to the DEAT SATF algorithm is shown in FIG. 3. The probability table of FIG. 3 indicates execution experience for executed commands that have been categorized according to seek distance and estimated extra latency. The seek distance is measured in terms of cylinder groups, and the estimated extra latency is measured in terms of servo ID's. For each category of commands, the corresponding data cell indicates the "miss rate", i.e. the percentage of executed commands in the category that have resulted in "misses". The execution experience data provided in a miss rate table like FIG. 3 may be used in accordance with the DEAT SATF algorithm to provide a modified estimated access time for each command in the command queue, thereby leading to improved selection of the next command for execution, by reducing the likelihood that a miss will occur during the execution of the selected command.

The present inventors have recognized that the extra latency or "on-track time" represented at 30 in the time line of FIG. 2 may present an opportunity for still further improvements in the efficiency of operation of a disk drive.

SUMMARY OF THE INVENTION

According to a first aspect of the invention, a method of operating a disk drive is provided. The inventive method according to this aspect of the invention includes maintaining a command queue that includes a plurality of access commands that are awaiting execution, and sorting the command queue to provisionally select one of the plurality of access commands as a next command to be executed. The inventive method according to this aspect of this invention further includes calculating a seek start deadline for the provisionally selected access command based on an estimated extra latency of the provisionally selected access command. The seek operation is then deferred with respect to the provisionally selected access command based on an outcome of the calculating step, to await arrival at the disk drive of a new access command. If a new access command arrives at the disk drive prior to the seek start deadline, the respective access times for the provisionally selected access command and the newly arrived access command are compared to select one of the two access commands for execution, and the selected one of the two access commands is executed. If no new access command arrives at the disk drive prior to the seek start deadline, then the provisionally selected access command is executed.

In at least one embodiment, the sorting step may be performed in accordance with an SATF algorithm. The SATF algorithm may be a DEAT SATF algorithm, i.e., one which takes into account estimated probabilities that the access commands in the command queue can be performed within estimated access times. Such a DEAT SATF algorithm may use, for example, a table of estimated probabilities that categories of access commands can be performed within estimated access times, the table having a first axis corresponding to cylinder groups and a second axis corresponding to estimated extra latencies. In one or more embodiments, the calculating step may be based on estimated probability values stored in the table. The calculating step may include examining adjacent probability values for a cylinder group to which the provisionally selected access command belongs, to determine whether deferring the seek operation with respect to the provisionally selected access command is likely to decrease a probability that the provisionally selected access command can be performed within an estimated access time.

According to a second aspect of the invention, a method of operating a disk drive is provided. The method in accordance with this aspect of the invention includes maintaining a command queue that includes a plurality of access commands that are awaiting execution, and sorting the command queue to provisionally select one of the plurality of access commands as a next command to be executed. The method according to this aspect of the invention further includes determining whether to defer execution of the provisionally selected access command based on an estimated extra latency of the provisionally selected access command. If it is determined not to defer execution of the provisionally selected access command, the provisionally selected access command is executed upon completion of execution of a previous access command. If it is determined to defer execution of the provisionally selected access command, a seek start deadline for the provisionally selected access command is calculated, and execution of the provisionally selected access command is deferred to await, until the seek start deadline, arrival at the disk drive of a new access command.

According to a third aspect of the invention, a method of operating a disk drive is provided. The method according to this aspect of the invention includes maintaining a command queue that includes a plurality of access commands that are awaiting execution, and sorting the command queue to provisionally select one of the plurality of access commands as a next command to be executed. The method in accordance with this aspect of the invention further includes calculating a seek start deadline for the provisionally selected access command based on an estimated extra latency of the provisionally selected access command. Also included in the method according to this aspect of the invention is deferring a seek operation with respect to the provisionally selected access command based on an outcome of the calculating step, to await arrival at the disk drive of a new access command. If no new access command arrives at the disk drive prior to the seek start deadline, the provisionally selected access command is executed. If a new access command arrives at the disk drive prior to the seek start deadline, it is determined which one of the provisionally selected access command and the newly arrived access command has a shorter estimated access time. If the newly arrived access command is determined to have a shorter estimated access time, it is determined whether to defer execution of the newly arrived access command based on an estimated extra latency of the newly arrived access command. If the provisionally selected access command is determined to have a shorter estimated access time, the method according to this aspect of the invention continues to defer the seek operation with respect to the provisionally selected access command to await, until the seek start deadline, arrival at the disk drive of another new access command.

In at least one embodiment, the determination as to which one of the provisionally selected access command and the newly arrived access command has a shorter estimated access time may take into account estimated probabilities that the provisionally selected access command and the newly arrived access command can be performed within respective estimated access times.

According to a further aspect of the invention, an apparatus for controlling a head actuator in a disk drive is provided. The apparatus includes a head control circuit programmed to perform one or more of the above-described methods.

The present invention takes advantage of the extra latency anticipated to occur in an access command that has been selected for execution pursuant to an SATF algorithm. Based on the expected extra latency, the beginning of the execution of the selected command can be deferred in order to await possible arrival of a new access command which may have a shorter estimated access time than the selected command. The deferral of the execution of the selected command may continue up until a deadline that has been set based on the anticipated extra latency for the selected command. If a new command is received prior to the deadline, the deferral of execution of the selected command has the effect of increasing the queue depth by one command. This may well lead to more efficient operation.

The present invention may provide particularly good results in a case where a number of threads executing at the host system each enqueue only a single access command at a time to the command queue. In this situation, each of the threads may wait to send the next access command for the thread upon receipt of a status message indicating execution of the access command that the thread had previously sent to the disk drive. The next command sent by the thread may be sequential or nearly sequential in operation of the disk drive to the command that was just executed by the disk drive for the thread. Consequently, in the situation where single commands are enqueued at any one time from each thread, the present invention may reduce jumping from thread to thread, and facilitate execution of a number of commands for a single thread in sequence. This is likely to result in greatly increased efficiency in operating the disk drive.

Other objects, features and advantages of the present invention will become more fully apparent from the following detailed description of exemplary embodiments, the appended claims and the accompanying drawings.

BRIEF DESCRIPTION OF THE DRAWINGS

FIG. 3 is an example of a probability table used in connection with selection of access commands from a command queue in a disk drive;

FIG. 6 is a selection of data taken from a probability table like that of FIG. 3, and used to illustrate a technique for determining a seek start deadline in accordance with the process of FIGS. 5A–5B.

DETAILED DESCRIPTION

The optimization technique provided in accordance with the invention may be referred to as "Patient Reordering". The basis for this term may be understood by reference to FIG. 4, which is a time line that illustrates the Patient Reordering algorithm. (Like the time line of FIG. 2, the time line of FIG. 4 is not drawn to scale.)

Figure 1:
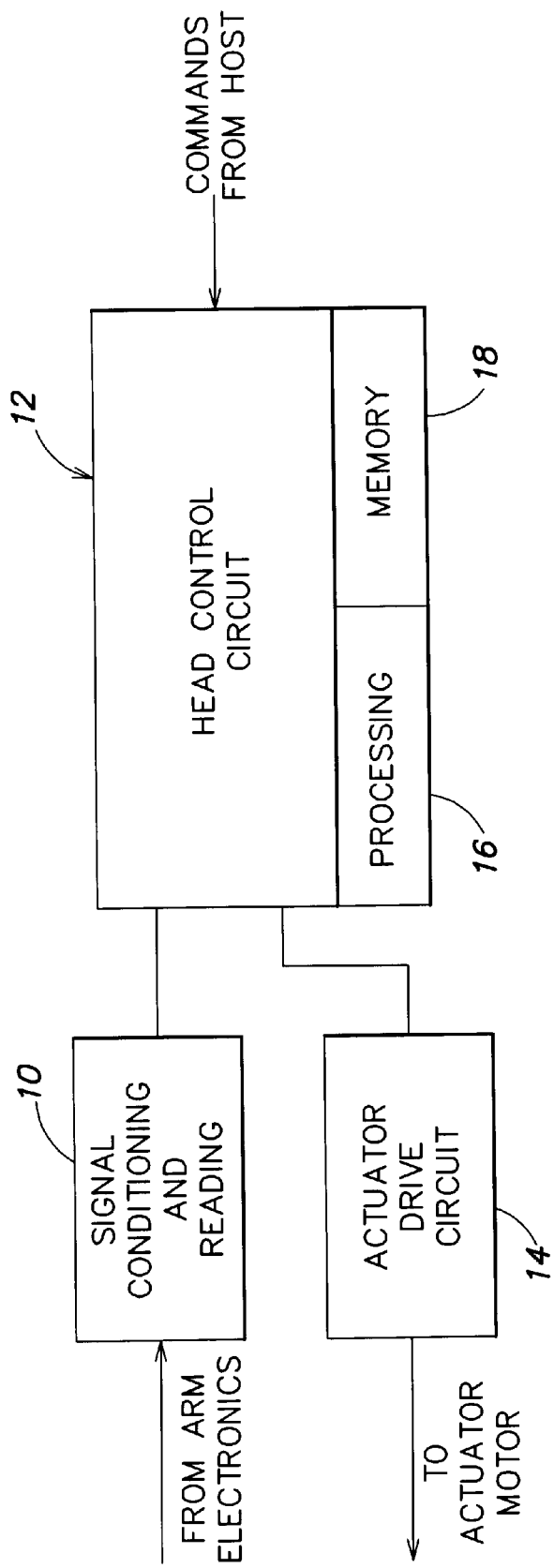
FIG. 1 is a simplified block diagram of a conventional circuit arrangement for controlling positioning of a head in a disk drive.
Figure 2:
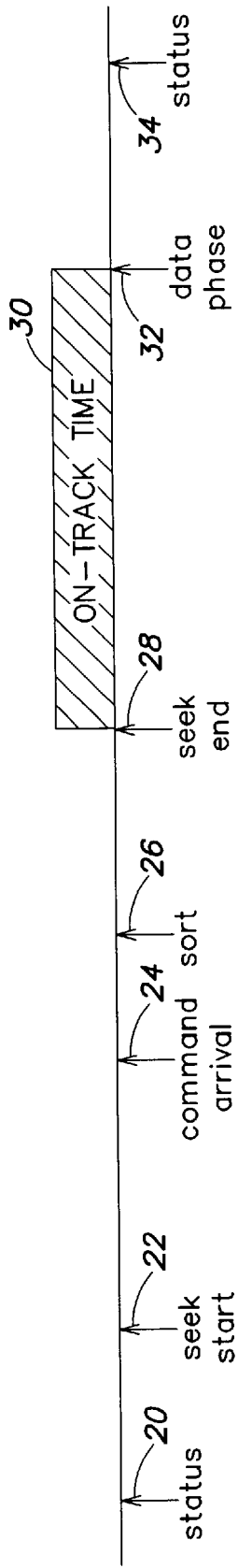
FIG. 2 is a time line that illustrates a sequence of events that occur during a conventional operation of a disk drive.

As in FIG. 2, a status message is transmitted, as indicated at 20, from the disk drive to the host system to indicate completion of execution of the previous command. It will be understood that prior to the issuance of the status message 20, and during execution of the command for which completion is indicated by the status message 20, the command queue had been sorted and a command had been selected to be the next to be executed.

Figure 4:
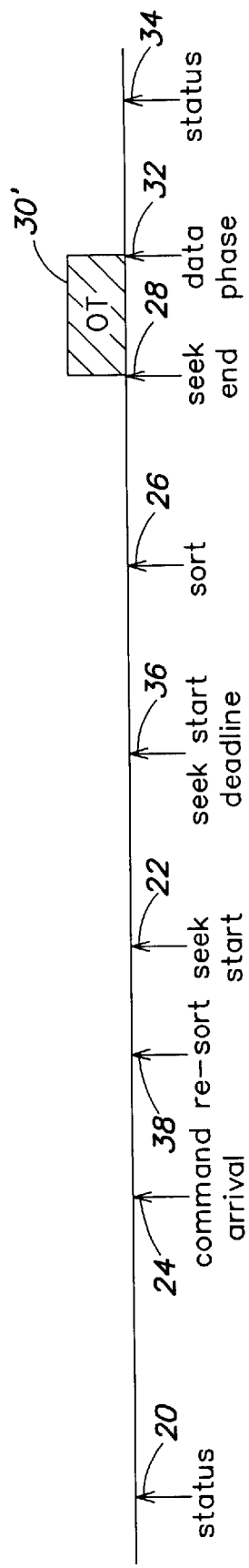
FIG. 4 is a time line that illustrates a sequence of events that occur during operation of a disk drive in accordance with the present invention.

Unlike the time line of FIG. 2, the time line of FIG. 4 includes a point of time designated as the "seek start deadline" (indicated at 36). The seek start deadline is determined, according to a technique that will be described below, as a point in time up to which execution of a previously selected command may be deferred without substantially increasing the likelihood that a "miss" will occur during execution of the selected command.

In another point of contrast between the time lines of FIGS. 2 and 4, the seek start 22 (which occurred shortly after the status message 20 in the time line of FIG. 2) may be deferred in the time line of FIG. 4 until after arrival of another command (indicated at 24) and up to the point of the seek start deadline 36. Assuming that there is a command 24 that arrives prior to the seek start deadline 36, then a "re-sort" operation, indicated at 38, is performed. That is, the newly arrived command is compared with the previously selected command to determine which of the two has a shorter access time. Whichever of the two has a shorter access time becomes the command selected for execution and of which execution is started at "seek start" 22. It will be observed that the seek start 22 and seek end 28 both occur later in the time line of FIG. 4 than in the time line of FIG. 2, and that the "on-track time" 30' shown in FIG. 4 is reduced from the on-track time 30 shown in FIG. 2. This reflects the use of the extra latency represented by the on-track time to defer the start of the command execution operation in the time line of FIG. 4. Provisional selection of the command to be executed after the command executed in the example of FIG. 4 occurs at 26 in FIG. 4, which may be later than in FIG. 2. As in the time line of FIG. 2, in FIG. 4 sending of a status message 34 from the disk drive to the host system indicates completion of execution of the command.

Figure 5A:
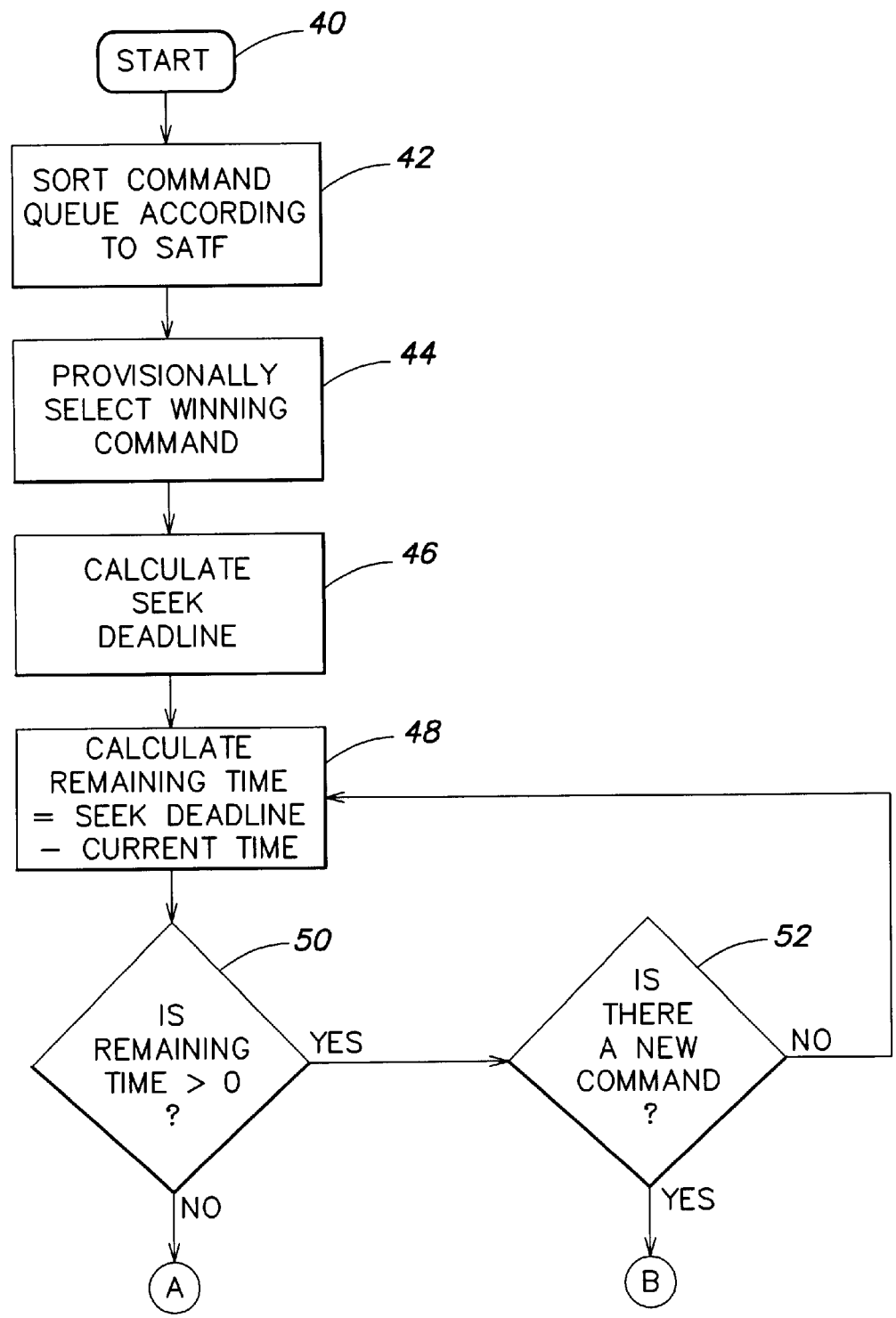
FIGS. 5A and 5B together form a flow chart that illustrates a process for operating a disk drive in accordance with the invention.
Figure 5B:
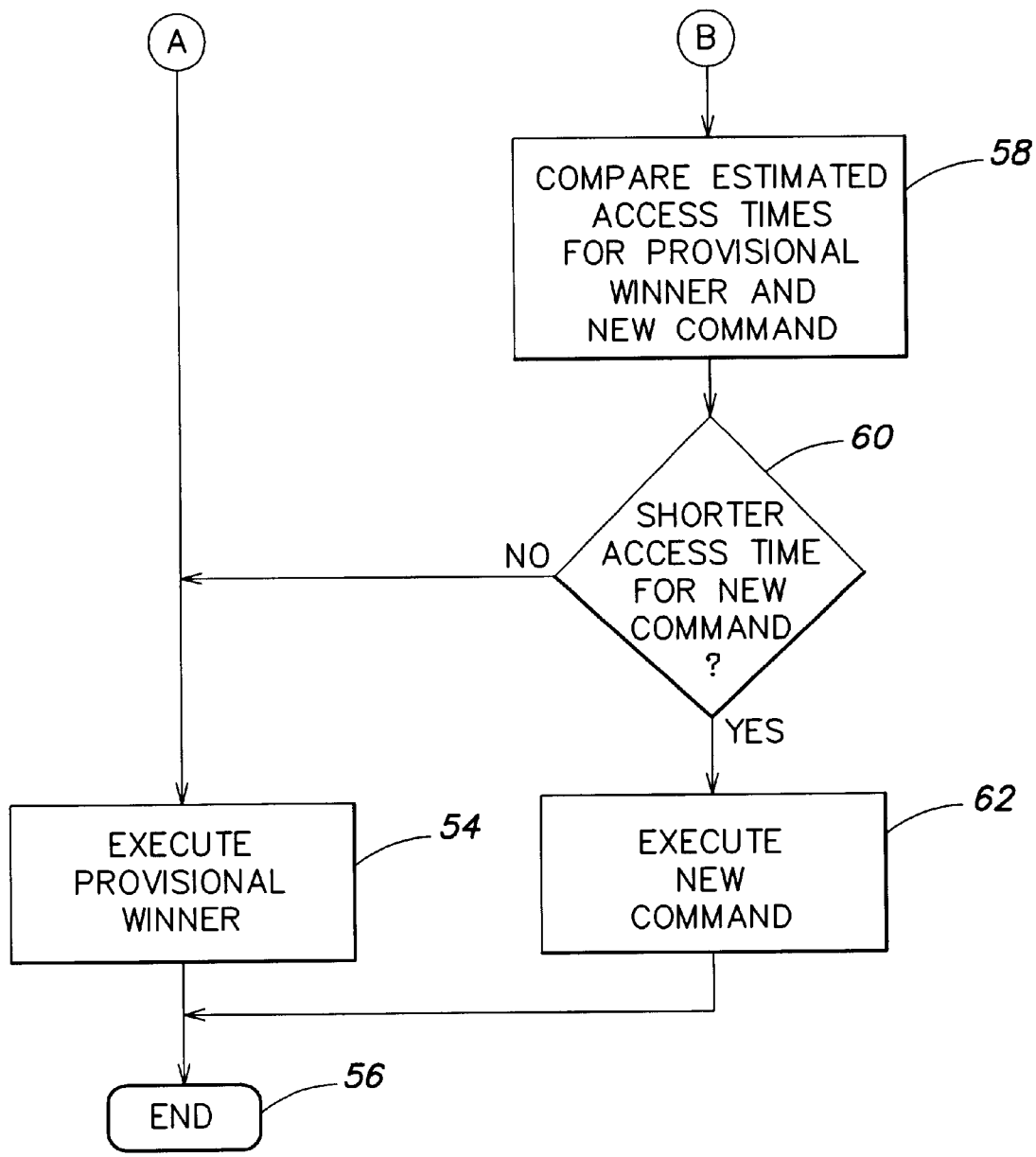

FIGS. 5A and 5B further illustrate the procedure of the present invention in the form of a flow chart. The procedure of FIG. 5A starts at 40 and proceeds to block 42. At block 42 the command queue is sorted in accordance with an SATF algorithm such as the above-referenced DEAT SATF algorithm. On the basis of the estimated access time for the commands in the queue, the command having the shortest estimated access time is provisionally selected to be the next command executed (block 44).

Blocks 42 and 44 correspond to the "sort" event 26 shown in FIG. 4. Following blocks 42 and 44, in accordance with the invention, a start seek deadline is calculated on the basis of the expected extra latency for the provisionally selected command (block 46). In one embodiment, the seek deadline is calculated so that deferring the execution of the command up to the seek deadline will not substantially increase the likelihood of a "miss" occurring during execution of the command. One manner in which such a seek deadline may be calculated is schematically illustrated in FIG. 6. It is assumed for the purposes of FIG. 6 that the provisionally selected command has a seek length that places it in cylinder group "X", and has an expected extra latency of 25 servo ID's. It is further assumed that the miss rate data for cylinder group X is as indicated in FIG. 6. It will be observed that the estimated extra latency of 25 servo ID's places the provisionally selected command in the "20+" category having a miss rate of three percent. It will also be observed that in the two categories immediately to the left of the 20+category, namely categories "18–20" and "15–17", the miss rate is also three percent. Accordingly, it can be concluded that even if the extra latency were as low as 15 servo ID's there would still be no substantial increase in the probability of a miss. Thus, there are ten servo ID's (25 minus 15) of "slack" in the estimated extra latency of the provisionally selected command. In other words, a "waiting time" of ten servo ID's can be interposed between the completion of the prior command and commencement of execution of the provisionally selected command without substantially increasing the likelihood of a miss. Consequently, a "seek start deadline" calculated as the time of completion of execution of the previous command, plus ten servo ID's, can be set as the seek start deadline in the particular example indicated in FIG. 6. It should be understood that the calculation of the available waiting time, and the corresponding setting of the seek start deadline, may take into account overhead such as the time required to execute programmed instructions and to commence execution of a seek operation. The available waiting time may be reduced by the amount of time which corresponds to the expected overhead, and the seek start deadline accordingly set at a point in time that is closer to the completion of execution of the previous command.

Considering another example using the data illustrated in FIG. 6, suppose that the provisionally selected command were in cylinder group X but had an estimated extra latency of 15 servo ID's or less. In such a case, execution of the provisionally selected command would not be deferred, since deferring of execution of the provisionally selected command would substantially increase the likelihood of a miss.

Referring again to FIG. 5A, block 48 follows block 46. At block 48 the time remaining until the seek start deadline is calculated according to the formula: remaining time=seek deadline−current time. Following block 48 is decision block 50. At decision block 50, it is determined whether the remaining time calculated at block 48 is greater than zero. If so, then decision block 52 follows decision block 50. At decision block 52, it is determined whether a new access command has arrived at the disk drive from the host system. If not, then the process of FIG. 5A loops back from decision block 52 to block 48. It will be recognized that the process of FIG. 5A continues to cycle through blocks 48, 50 and 52 until either the seek start deadline is reached or a new access command arrives at the disk drive. Assuming that no new access command arrives before the seek start deadline occurs, then a negative determination is made at decision block 50, and block 54 (FIG. 5B) follows decision block 50. At block 54, the provisionally selected access command is executed, by starting the seek operation for the access command. The process of FIGS. 5A–5B then ends (56).

On the other hand, if a new access command arrives at the disk drive before the seek start deadline is reached, then a positive determination is made at decision block 52, and block 58 (FIG. 5B) follows decision block 52. At block 58, the estimated access times for the command provisionally selected at block 44 and the newly arrived command are compared. The comparison may take into account probability data like that shown in FIG. 3. In other words, a DEAT SATF algorithm may be employed for the comparison. Following block 58 is decision block 60. At decision block 60, it is determined whether the new command has a shorter estimated access time than the provisionally selected access command. If not, the provisionally selected access command is executed (block 54) and the process ends (56). However, if it is found at decision block 60 that the newly arrived access command has a shorter estimated access time than the provisionally selected access command, then block 62 follows decision block 60. At block 62 the newly arrived access command is executed and the process ends (56).

It should be understood that in comparing the expected access times of the provisionally selected command and the newly arrived command, the expected access time of the provisionally selected command is updated to reflect the deferral of execution of the provisionally selected command up to the time when the new command arrived.

In the procedure illustrated in FIGS. 5A–5B, execution of either the provisionally selected access command or the newly arrived access command follows arrival of the new command and comparison of the estimated access times for the two commands. However, it is contemplated to modify the procedure of FIGS. 5A–5B to await arrival of another new command, if time allows. For example, if it is found at decision block 60 that the provisionally selected access command has the shorter access time, then the procedure of FIGS. 5A–5B could loop back from decision block 60 to block 48. Alternatively, if at decision block 60 it was found that the newly arrived access command had the shorter access time, a seek start deadline could be calculated for the newly arrived access command, and any available time could be used to await another new command. If another new command does arrive, then a selection is made between the two "new" commands based on which one has the shorter estimated access time.

In accordance with the invention, execution of an access command may be delayed, for an amount of time which is not expected to cause a "miss", to await arrival of another command that may have a shorter access time than the command whose execution is delayed. Awaiting of the next command may be particularly advantageous in connection with a situation in which a number of threads executing on the host system maintain one and only one command apiece in the command queue at any given time. In this situation, typically, each thread sends a new command to the disk drive immediately upon execution of the previous command for the thread. Accordingly, the new command which is next received after execution of a command may be from the same thread, and accordingly may be sequential or nearly-sequential to the command which was just executed. As a result, the new command may have a very short access time and is likely to be a superior candidate for execution, in terms of efficiency of operation of the disk drive, relative to the command which was next selected for execution during execution of the previous command, since the selected command would be from another thread and would not be sequential or near-sequential to the command just executed. Thus the procedure of the present invention may lead to great improvements in the efficiency of operation of the disk drive, by allowing commands from a single operating thread to be processed in sequence.

Even if the Patient Reordering procedure of the present invention does not operate to promote sequential execution of commands from the same operating thread, it tends to increase the effective queue depth which may in itself lead to more efficient operation of the disk drive.

The foregoing description discloses only exemplary embodiments of the invention; modifications of the above disclosed apparatus and methods which fall within the scope of the invention will be readily apparent to those of ordinary skill in the art.

For example, in the embodiment of the invention described above, the waiting time for execution of the next access command is determined by reference to a probability table generated in accordance with a DEAT SATF algorithm. However, it is alternatively contemplated to use the present invention in connection with an SATF algorithm which is not a DEAT SATF algorithm, and to set a waiting time on the basis of an estimated extra latency provided by a seek profile table, while taking into account an appropriate margin to reduce the likelihood of generating a "miss" by waiting.

The Patient Reordering scheme disclosed above was operating so as not to increase the possibility of a "miss".

However it is also contemplated to incur an increased risk of misses in the interest of waiting for a potentially more favorable access command to arrive. For example, it may be contemplated to delay execution of the command selected by an SATF procedure whenever the selected command has an expected access time that is greater than an average access time.

Accordingly while the present invention has been disclosed in connection with exemplary embodiments thereof, it should be understood that other embodiments may fall within the spirit and scope of the invention, as defined by the following claims.

The invention claimed is:

1. A method of operating a disk drive, comprising:
   maintaining a command queue that includes a plurality of access commands that are awaiting execution;
   sorting the command queue to provisionally select one of the plurality of access commands as a next command to be executed;
   calculating a seek start deadline for the provisionally selected access command based on an estimated extra latency of the provisionally selected access command;
   deferring a seek operation with respect to the provisionally selected access command based on an outcome of the calculating step, to await arrival at the disk drive of a new access command;
   if a new access command arrives at the disk drive prior to the seek start deadline, comparing respective estimated access times for the provisionally selected access command and the newly arrived access command to select one of the two access commands for execution, and executing the selected one of the two access commands; and
   if no new access command arrives at the disk drive prior to the seek start deadline, executing the provisionally selected access command.

2. The method of claim 1, wherein the sorting step is performed in accordance with an SATF (shortest access time first) algorithm.

3. The method of claim 2, wherein the SATF algorithm takes into account estimated probabilities that the access commands in the command queue can be performed within estimated access times.

4. The method of claim 3, wherein the SATF algorithm uses a table of estimated probabilities that categories of access commands can be performed within estimated access times, the table having a first axis corresponding to cylinder groups and a second axis corresponding to estimated extra latencies, and the calculating step is based on estimated probability values stored in the table.

5. The method of claim 4, wherein the calculating step includes examining adjacent probability values for a cylinder group to which the provisionally selected access command belongs, to determine whether deferring the seek operation with respect to the provisionally selected access command will decrease a probability that the provisionally selected access command is performable within an estimated access time.

6. The method of claim 1, wherein the command queue has no more than one access command from each operating thread of a host computer to which the disk drive is attached.

7. The method of claim 1, wherein the estimated extra latency of the provisionally selected access command is measured in servo ID's.

8. The method of claim 1, wherein the comparing step takes into account estimated probabilities that the provisionally selected access command and the newly arrived access command can be performed within respective estimated access times.

9. A method of operating a disk drive, comprising:
   maintaining a command queue that includes a plurality of access commands that are awaiting execution;
   sorting the command queue to provisionally select one of the plurality of access commands as a next command to be executed;
   determining whether to defer execution of the provisionally selected access command based on an estimated extra latency of the provisionally selected access command;
   if it is determined not to defer execution of the provisionally selected access command, executing the provisionally selected access command upon completion of execution of a previous access command; and
   if it is determined to defer execution of the provisionally selected access command, calculating a seek start deadline for the provisionally selected access command and deferring execution of the provisionally selected access command to await, until the seek start deadline, arrival at the disk drive of a new access command.

10. The method of claim 9, wherein the sorting step is performed in accordance with an SATF (shortest access time first) algorithm.

11. The method of claim 10, wherein the SATF algorithm takes into account estimated probabilities that the access commands in the command queue can be performed within estimated access times.

12. A method of operating a disk drive, comprising:
   maintaining a command queue that includes a plurality of access commands that are awaiting execution;
   sorting the command queue to provisionally select one of the plurality of access commands as a next command to be executed;
   calculating a seek start deadline for the provisionally selected access command based on an estimated extra latency of the provisionally selected access command;
   deferring a seek operation with respect to the provisionally selected access command based on an outcome of the calculating step, to await arrival at the disk drive of a new access command;
   if no new access command arrives at the disk drive prior to the seek start deadline, executing the provisionally selected access command;
   if a new access command arrives at the disk drive prior to the seek start deadline, determining which one of the provisionally selected access command and the newly arrived access command has a shorter estimated access time;
   if the newly arrived access command is determined to have a shorter estimated access time, determining whether to defer execution of the newly arrived access command based on an estimated extra latency of the newly arrived access command; and
   if the provisionally selected access command is determined to have a shorter estimated access time, continuing to defer the seek operation with respect to the provisionally selected access command, to await, until the seek start deadline, arrival at the disk drive of another new access command.

13. The method of claim 12, wherein the determination as to which one of the provisionally selected access command and the newly arrived access command has a shorter estimated access time takes into account estimated probabilities that the provisionally selected access command and the newly arrived access command can be performed within respective estimated access times.

14. The method of claim 12, wherein the sorting step is performed in accordance with an SATF (shortest access time first) algorithm.

15. The method of claim 14, wherein the SATF algorithm takes into account estimated probabilities that the access commands in the command queue can be performed within estimated access times.

16. An apparatus for controlling a head actuator in a disk drive, comprising:

a head control circuit programmed to:
maintain a command queue that includes a plurality of access commands that are awaiting execution;
sort the command queue to provisionally select one of the plurality of access commands as a next command to be executed;
calculate a seek start deadline for the provisionally selected access command based on an estimated extra latency of the provisionally selected access command;
defer a seek operation with respect to the provisionally selected access command based on an outcome of the calculation of the seek start deadline, to await arrival at the disk drive of a new access command;
if a new access command arrives at the disk drive prior to the seek start deadline, compare respective estimated access times for the provisionally selected access command and the newly arrived access command to select one of the two access commands for execution, and execute the selected one of the two access commands; and
if no new access command arrives at the disk drive prior to the seek start deadline, execute the provisionally selected access command.

17. An apparatus for controlling a head actuator in a disk drive, comprising:

a head control circuit programmed to:
maintain a command queue that includes a plurality of access commands that are awaiting execution;
sort the command queue to provisionally select one of the plurality of access commands as a next command to be executed;
determine whether to defer execution of the provisionally selected access command based on an estimated extra latency of the provisionally selected access command;
if it is determined not to defer execution of the provisionally selected access command, execute the provisionally selected access command upon completion of execution of a previous access command; and
if it is determined to defer execution of the provisionally selected access command, calculate a seek start deadline for the provisionally selected access command and defer execution of the provisionally selected access command to await, until the seek start deadline, arrival at the disk drive of a new access command.

18. An apparatus for controlling a head actuator in a disk drive, comprising:

a head control circuit programmed to:
maintain a command queue that includes a plurality of access commands that are awaiting execution;
sort the command queue to provisionally select one of the plurality of access commands as a next command to be executed;
calculate a seek start deadline for the provisionally selected access command based on an estimated extra latency of the provisionally selected access command;
defer a seek operation with respect to the provisionally selected access command based on an outcome of the calculation of the seek start deadline, to await arrival at the disk drive of a new access command;
if no new access command arrives at the disk drive prior to the seek start deadline, execute the provisionally selected access command;
if a new access command arrives at the disk drive prior to the seek start deadline, determine which one of the provisionally selected access command and the newly arrived access command has a shorter estimated access time;
if the newly arrived access command is determined to have a shorter estimated access time, determine whether to defer execution of the newly arrived access command based on an estimated extra latency of the newly arrived access command; and
if the provisionally selected access command is determined to have a shorter estimated access time, continue to defer the seek operation with respect to the provisionally selected access command, to await, until the seek start deadline, arrival at the disk drive of another new access command.

* * * * *